United States Patent [19]

Ménard et al.

[11] Patent Number: 4,916,098

[45] Date of Patent: Apr. 10, 1990

[54] PROCESS AND APPARATUS FOR MANUFACTURING AN ELECTROCATALYTIC ELECTRODE

[75] Inventors: Hugues Ménard, Sherbrooke; Louis Brossard, Ste-Julie; Yves Choquette, Anjou, all of Canada

[73] Assignee: Sherbrooke University, Quebec, Canada

[21] Appl. No.: 273,812

[22] Filed: Nov. 21, 1988

[51] Int. Cl.⁴ .................. H01M 4/88; C25D 15/00
[52] U.S. Cl. ...................... 502/101; 204/35.1; 204/45.1; 204/49; 204/213; 204/273
[58] Field of Search .............. 204/16, 273, 212, 213, 204/199, 45.1, 49, 35.1; 502/101

[56] References Cited

U.S. PATENT DOCUMENTS

| | | | |
|---|---|---|---|
| 1,051,556 | 1/1913 | Consigliere | 204/213 X |
| 1,563,787 | 12/1925 | Pihl | 381/200 |
| 1,628,191 | 5/1927 | Rattay | 200/6 C |
| 1,915,473 | 6/1933 | Raney | 502/301 |
| 3,790,454 | 2/1974 | Henderson et al. | 204/49 |
| 4,116,804 | 9/1978 | Needes | 204/284 |
| 4,240,895 | 12/1980 | Gray | 204/290 |
| 4,255,247 | 3/1981 | Oda et al. | 204/293 |
| 4,278,568 | 7/1981 | Lohrberg et al. | 252/472 |
| 4,300,993 | 11/1981 | Divisek et al. | 204/290 |
| 4,302,322 | 11/1981 | Oda et al. | 204/293 |
| 4,305,792 | 12/1981 | Kedward et al. | 204/16 |
| 4,666,568 | 5/1987 | Dash | 204/16 |
| 4,724,052 | 2/1988 | Nidola | 204/16 |

FOREIGN PATENT DOCUMENTS 651826 11/1962 Canada .................. 204/16

Primary Examiner—G. L. Kaplan
Attorney, Agent, or Firm—Cushman, Darby & Cushman

[57] ABSTRACT

A process and an apparatus for manufacturing electrocatalytic electrodes. The process comprises the steps of immersing a substrate in a plating bath containing metal ions and electrocatalytic material in particles form, such as Ni, NiAl, and CoAl, among others. Electric current is established in the bath inducing a deposition of metal on the substrate by reduction of metal ions and, simultaneously, the cell containing the plating bath is inverted periodically to cause a recurrent migration of the particles of electrocatalytic material, under the effect of gravity, toward the substrate, in order to build-up a layer of electrocatalytic material on the substrate, the particles of the electrocatalytic material being fixed on the substrate by the reduction of metal ions.

16 Claims, 2 Drawing Sheets

PROCESS AND APPARATUS FOR MANUFACTURING AN ELECTROCATALYTIC ELECTRODE

FIELD OF THE INVENTION

The present invention relates to a process and to an apparatus for depositing electrocatalytic material on a substrate by a composite-coating technique. Advantageously, the invention may be used for manufacturing electrocatalytic electrodes employed for the industrial production of hydrogen, oxygen or other gases, by electrolysis.

BACKGROUND OF THE INVENTION

It has been widely recognized that nickel, nickel alloys and cobalt alloys, among others, are very active electrocatalysts, well suited for use on a hydrogen-evolution cathode in an electrolytic cell. Among the above materials, nickel and its alloys, such as NiAl, the so called "Raney-nickel", are preferred because they are stable in a basic medium and interesting from the standpoint of availability and cost.

Raney-Nickel is prepared typically by leaching aluminum from a NiAl alloy or zinc from a NiZn alloy. The techniques developed in the past for depositing NiAl or NiZn on a substrate for producing an electrode for example, are summarized hereinafter:

(a) Deposition by a thermal-plasma technology; U.S. Pat. No. 4,240,895, granted to Olin Corporation on Dec. 23, 1980;

(b) Thermal-interdiffusion of aluminum in a nickel matrix; U.S. Pat. No. 4,116,804, granted to Dupont de Nemour and Co. on Sept. 26, 1978;

(c) Immersion of a substrate in a molten nickel alloy; A. Nidola and R. Schira, Extended Abstract No. 236 (May 6–11, 1984);

(d) Pressing at a high temperature a mixture of nickel powder and Nickel alloy powder; U.S. Pat. No. 4,278,568, granted to Metallgesellschaft Aktiengesellschaft on July 14, 1981; and (e) Electrocodeposition of a Nickel alloy on a metallic substrate; U.S. Pat. Nos. 4,255,247 and 4,302,322, granted to Asahi Glass Company on Mar. 10, 1981 and Nov. 24, 1981, respectively.

Among the above techniques, the electrocodeposition process is the most attractive, mainly because it is relatively inexpensive to put in practice.

The electrocodeposition process may be defined as the simultaneous deposition on a substrate of two species in a solution, namely metal ions and small particles fixed on the substrate by the reduction thereon of metal ions. For the deposition of NiAl, the substrate may be placed into an electroplating nickel bath containing water soluble salts such as $NiSO_4$, $NiCl_2$, etc., in which is also added a certain quantity of NiAl powder, the NiAl particles being captured in the nickel matrix electrodeposited on the substrate.

With conventional electrocodeposition processes, the relative amount of co-deposited NiAl particles (hereinafter "$r_a$") may reach a maximum of 45 wt. % (particle size 73 μm). It has been observed that $r_a$ tends to decrease significantly with time due to the passivation of NiAl particles. In addition, the maximum value of $r_a$ is significantly reduced in the presence of small particles e.g. $r_a$ is 35 wt. % for an average particle size of 30 μm.

It has been widely accepted that the higher the $r_a$ value, the better the performance of the electrocatalytic electrode will be. Therefore, an object of the present invention is to provide an improved process and an apparatus for manufacturing an electrocatalytic electrode by depositing on a substrate an electrocatalytic material in particulate form, by a composite coating technique, allowing to increase the relative amount of particulate material in the coating comparatively to conventional composite-coating processes.

The process, according to a preferred embodiment of the invention, comprises the steps of placing the substrate to be coated into a metal plating bath, containing particles of electrocatalytic material such as Fe, Ni, Co or Cu, or alloys thereof, the other metal of the alloy being selected in the group consisting of Al, Zn, Cd, Sn and Mo, flowing electric current in the bath, between an anode and the substrate constituting the cathode, to induce metal deposition on the substrate by a reduction of metal ions. The cell containing the plating solution is subjected to a controlled motion causing, under the effect of gravity, a recurrent migration of the electrocatalytic material toward the substrate to build-up a coating of the electrocatalytic material, retained on the substrate in a binder formed by a reduction of metal ions on the substrate.

Advantageously, the process is used for coating, in the same operation, the two main faces of a plate-like substrate, by inverting periodically the electroplating cell so that the surfaces of the substrate are successively exposed to face up. The inversion of the electroplating cell causes electrocatalytic material, migrating toward the bottom of the cell, to adhere to the upwardly facing surface of the substrate. The inversion of the cell is repeated as many times as required in order to build up a coating of the electrocatalytic material of the desired thickness on each surface.

The frequency with which the cell is inverted is a function of the particle size of the electrocatalytic material; the larger the particles, the higher the frequency because the particles migrate faster.

In addition to the cell inversion, it has been found advantageous, although not essential, to stir from time to time the plating bath, preferably before each deposion run, to induce strong interparticular collisions. The abrasive effect of such collisions has a cleaning action allowing to remove undesirable deposits from the particles surface to render them more active, thus reducing the detrimental effect of particles aging on $r_a$.

When the particulate material is an alloy, preferably at the end of the deposition run the electrode is leached in an acid or in an alkaline medium to remove the soluble metallic component of the alloy. It is believed that this additional step increases somewhat the electrode efficiency because the small voids in the coating, resulting from the removal of the soluble metal, contribute to augment the active contact surface of the electrode.

The apparatus for carrying out the method, according to the invention, comprises an electroplating cell, receiving the substrate to be coated, connected to a suitable mechanism to impart a controlled motion to the cell for causing a migration of the particles under the effect of gravity.

Advantageously, at the bottom of the cell is provided a stirrer for agitating the solution to depassivate the particulate material as explained above.

The present invention comprises, in a general aspect, a process for manufacturing an electrocatalytic electrode, comprising the steps of:

(a) placing a substrate in a solution containing metal ions and a dispersed electrocatalytic particulate material selected in the group consisting
  (1) Fe;
  (2) Ni;
  (3) Co;
  (4) Cu; and
  (5) an alloy of at least two metals, namely a first metal and a second metal, the first metal being selected in the group consisting of:
    (i) Fe;
    (ii) Ni;
    (iii) Co; and
    (iiii) Cu,
the second metal being selected in the group consisting of:
  (i) Al;
  (ii) Zn;
  (iii) Cd;
  (iiii) Sn; and
  (iiiii) Mo,
(b) flowing electric current in the solution between an anode and a cathode in electric contact with the solution, the substrate constituting the cathode, the current flow inducing a deposition of metal on the substrate by reduction of metal ions constituting a binder for retaining electrocatalytic material to the substrate; and
(c) causing a recurrent migration of the electrocatalytic material toward the substrate, under the effect of gravity, in order to build-up a coating of the electrocatalytic material on the substrate, the electrocatalytic material being captured in the binder.

The invention also extends to an apparatus for manufacturing an electrocatalytic electrode, the apparatus comprising:
(a) a cell for receiving a plating solution, the solution including metal ions and dispersed electrocatalytic particulate material selected in the group consisting of:
  (1) Fe;
  (2) Ni;
  (3) Co;
  (4) Cu; and
  (5) an alloy of at least two metals, namely a first metal and a second metal, the first metal being selected in the group consisting of:
    (i) Fe;
    (ii) Ni;
    (iii) Co; and
    (iiii) Cu,
the second metal being selected in the group consisting of:
  (i) Al;
  (ii) Zn;
  (iii) Cd;
  (iiii) Sn; and
  (iiiii) Mo,
(b) an anode and a cathode in contact with the solution, the substrate constituting the cathode;
(c) an electric power source in operative relation with the anode and with the cathode to establish in the solution a flow of electric current therebetween for inducing a deposition of a metal layer on the substrate by reduction of metal ions, constituting a binder for retaining the electrocatalytic particulate material to the substrate;
(d) motive means in driving relation with the cell to impart to the cell a controlled motion for causing a recurrent migration of the dispersed particles, under the effect of gravity, toward the substrate in order to build up a coating of the electrocatalytic material on the substrate, the particles of electrocatalytic material being captured in the binder.

DESCRIPTION OF A PREFERRED EMBODIMENT

Figure 1:
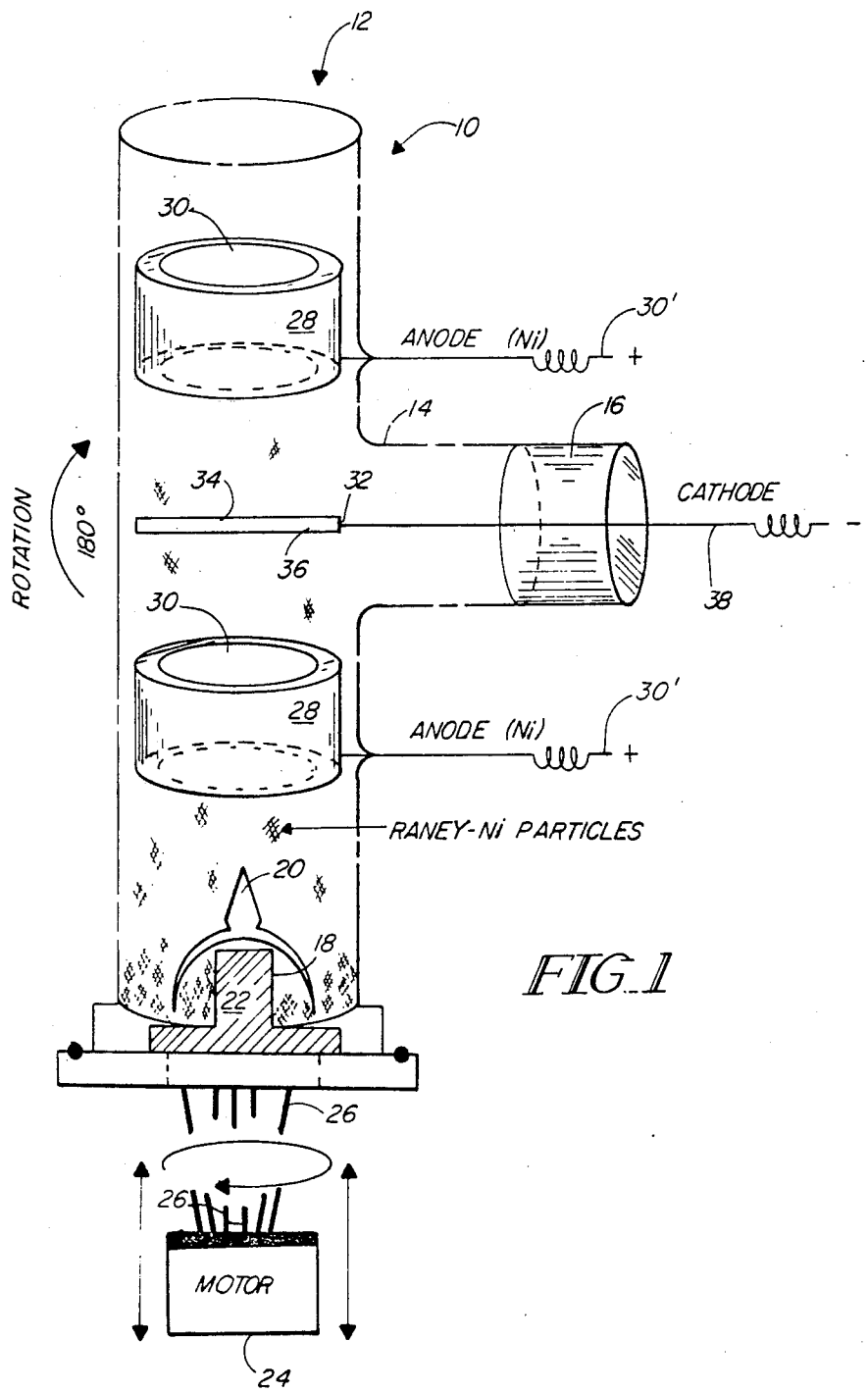
FIG. 1 illustrates schematically a composite coating apparatus, according to the invention.

Referring now to FIG. 1, the reference numeral 10 designates, in general, a composite coating apparatus which may be used for producing an electrocatalytic electrode coated with electrocatalytic material. The apparatus 10 comprises an electroplating PYREX cell 12, generally elongated, having a diameter of several centimeters. At mid-section of the cell 12 projects laterally an extension 14 whose free end is closed by a rubber plug 16. The rubber plug serves as a support for a substrate to be coated.

At the lower end of the cell 12 is provided a stirrer 18 including an agitator 20 mounted on a shaft 22. The shaft 22 extends outside the cell 12 and it is adapted to be connected to a motor 24 through a conventional releasable coupling 26 for driving the agitator 20, the motor 24 being connected in driving relationship to the agitator 20 only when the cell is in the position shown in FIG. 1 (for the purpose of clarity, FIG. 1 shows the coupling 26 disengaged. It is to be understood that the motor 24 is in fact positioned higher so that the coupling 26 is engaged).

The electroplating cell 12 also comprises a pair of anodes 28, in the form of annular members defining passages 30 for the free circulation of electrocatalytic material in the cell 12, under the effect of gravity, as it will be explained hereinafter. Each annular member 28 is being electrically connected to a conductor 30' passing through the wall of the cell 12.

The anodes 28, as well as the substrate constituting the cathode, are connected to the positive and the negative terminals respectively, of a power source (not shown) to establish a flow of electric current in the solution contained in the cell 12.

The electroplating cell 12 is connected to a motor (not shown in the drawings) to rotate the cell about the longitudinal axis of the extension 14. The cell rotating mechanism will not be described here because its structure is not critical for the success of the invention. Furthermore, the construction of such mechanism is well within the reach of a man skilled in the art.

The operation of the apparatus 10 will be described in the following examples of a composite coating process of a substrate.

EXAMPLE 1

The substrate to be coated, designated by the reference numeral 32 has two main faces, 34 and 36 respectively, on which particles of electrocatalytic material are to be deposited. The substrate 32, in the form of a plate, illustrated in FIG. 1 as being generally horizontally oriented, is connected to a stem 38 passing through the rubber plug 16 which serves as a support for the substrate 32.

In this example, the electrocatalytic material is NiAl and the metal ions in the plating solution are nickel ions.

In the electroplating cell 12 is placed a solution of 300 g/L of $NiSO_4.6H_2O$, 45 g/L of $NiCl_2.6H_2O$ and 30 g/L of $H_3BO_3$. In the solution is dispersed NiAl in particulate form (Ni 50 wt. %; Al 50 wt. %; the particle size varying from 53 to 74 μm), at 40 g/L. The substrate is a copper grate having a geometrical surface of one square centimeter (0.5 cm² per face).

The power source is turned on, to establish in the bath a current flow with a density of 30 mA/cm², the current flowing between each anode 28 and a respective face of the substrate 32 to deposit on each face a layer of nickel by reduction of nickel ions.

Simultaneously, the electrolytic cell 12 is rotated rapidly at 180° at 90 seconds intervals for the entire duration of the electrocodeposition run which is of 30 minutes. Immediately after each rotation, the particles of NiAl migrate toward the bottom of the cell 12, passing through the openings 30 defined by the anodes 28. Some of the particles will be captured on the substrate 32 by the nickel electrodeposited simultaneously on the top face of the substrate 32. A coating of NiAl is thus built-up on each face of the substrate 32, in successive deposition cycles, the particles of NiAl being captured in a nickel binder.

The pH of the solution is at 5 at the beginning of the deposition run and the temperature is held at 25° C.

At the end of the deposition run, the substrate 32 is removed from the solution. It is observed that it is coated uniformly with NiAl particles captured in a nickel binder, the percentage of NiAl particles by weight in the coating being of 71%.

If desired, when the deposition run is terminated, the aluminum from the deposited NiAl alloy may be removed by a known leaching technique.

Examples of other deposition runs where the operating conditions have somewhat been changed, are given in Table 1. It should be observed that for examples 3 and 4, where the particle size is smaller than in the examples 1 and 2, the amount of electrocatalytic material deposited on the substrate is lower.

EXAMPLE 5

Figure 2:
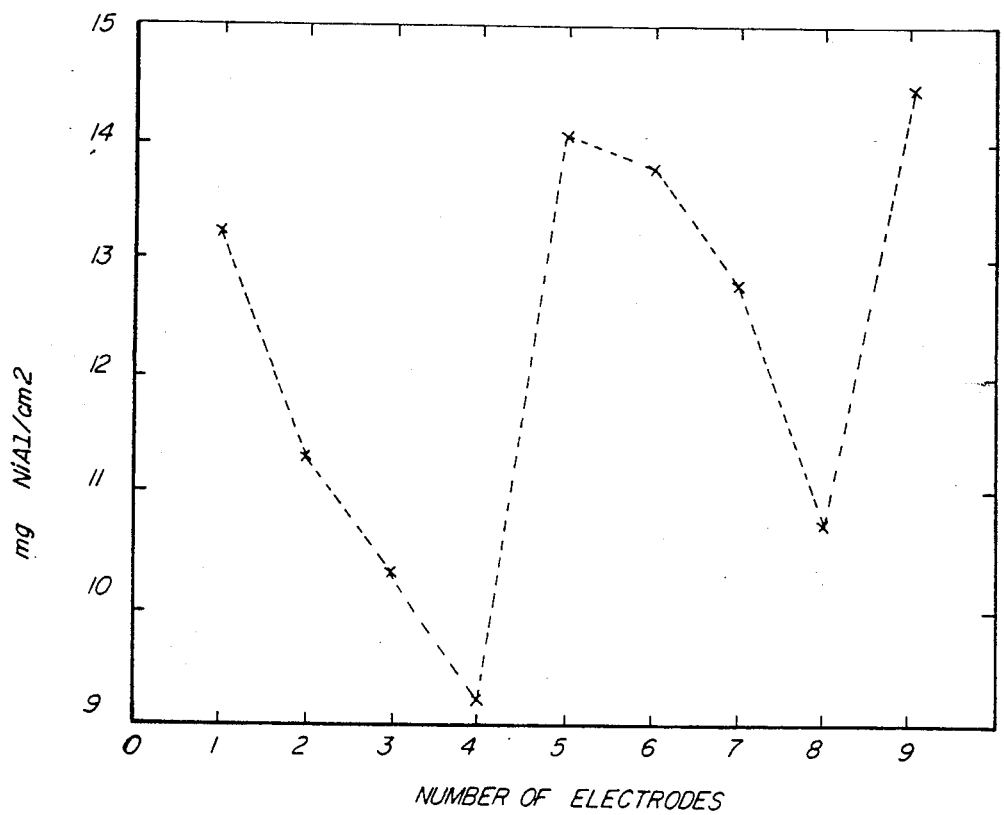
FIG. 2 is a diagram illustrating the influence of stirring the electro-plating bath on the amount of co-deposited particles of electrocatalytic material.

Example 5, in conjunction with FIG. 2, illustrates the influence of an intense mechanical stirring of the electroplating bath on the quantity of electrodeposited electrocatalytic material. The substrate 32 is a copper plate having a geometrical surface of one square centimeter (0.5 cm² per face). The composition of the electrocodeposition bath is the same as in Example 1. The size of the particles of NiAl is less than 38 μm. The bath temperature is held at 60° C. Ten substrates are coated successively by using the same solution without replenishment. Substrates 1, 2, 3 and 4 are coated successively at 60 minutes intervals. It may be observed that the codeposed quantity of NiAl diminishes in accordance with the residence time of the particles in the solution (see Table 2). Before plating electrode 5, the agitator 20 is activated for three minutes in order to agitate the particles which have been passivated by contact with the solution during four hours. This agitation permits to increase the quantity of codeposited NiAl by 10 wt. %. A new set of electrodes, electrodes 6, 7 and 8, are plated without agitation allowing to observe the particles aging phenomenon resulting in a decrease of the percentage in the quantity of the codeposited NiAl. Stirring the bath before plating electrode 9, permits to increase the quantity of codeposited NiAl up to a level reached only with electrodes 5 and 1 (particles freshly introduced in the solution).

| Table 2 and the diagram of Figure 2 summarize example 5. | | |
|---|---|---|
| Electrodes | Particles aging in minutes | wt % of particles deposited |
| 1 | 0 | 47% |
| 2 | 60 | 45% |
| 3 | 120 | 42% |
| 4 | 180 | 39% |
| Agitation during 3 minutes | | |
| 5 | 240 | 50% |
| 6 | 300 | 49% |
| 7 | 360 | 47% |
| 8 | 420 | 44% |
| Agitation during 3 minutes | | |

TABLE 1

| Ex. | Particles | Granularity μm | Mechanical agitation | Bath | Substrate | Temp. C. | wt % of particles deposited |
|---|---|---|---|---|---|---|---|
| 1 | NiAl 50%/50% wt | 53–74 | none | Watts | copper grate/plate | 25° | 71% |
| 2 | NiAl 50%/50% wt | 53–74 | none | ammonia $NiCl_2.6H_2O$ = 213 g $NH_4Cl$ = 30 g $NH_4OH$ = 200 ml pH 8.0–8.5 per liter | stainless steel grate/plate | 25° | 56% |
| 3 | Ni | ≦38 | none | $NiCl_2.6H_2O$ = 320 g $H_3BO_3$ = 30 g per liter pH = 5.1 | copper plate/grate | 60° | 51% |
| 4 | CoAl 50%/50% wt | ≦38 | none | $CoSO_4.6H_2O$ = 330 g $CoCl_2.6H_2O$ = 45 g $H_3BO_3$ = 30 g KCl 20 g per liter pH = 5.2 | copper plate/grate | 60° | 40% |

-continued

Table 2 and the diagram of Figure 2 summarize example 5.

| Electrodes | Particles' aging in minutes | wt % of particles deposited |
|---|---|---|
| 9 | 480 | 51% |

From example 5, it becomes clear that an intense mechanical stirring of the solution permits to control the quantity of electrocatalytic material deposited. This is a notable advantage allowing to produce a plurality of electrodes from the same bath with a consistency in the quantity of electrocatalytic material deposited, from one electrode to the other.

The above description of a preferred embodiment of the present invention has been given as an example only and it should not be interpreted in any limiting manner since this preferred embodiment may be refined in various ways without departing from the spirit of the invention.

We claim:

1. A process for manufacturing an electrocatalytic electrode, comprising the steps of:
   placing an electrically conductive substrate in a solution contained in an electrolytic cell, said solution itself containing ions of a metal and dispersed particles of an electrocatalytic material selected from the group consisting of:
   (1) Fe;
   (2) Ni;
   (3) Co;
   (4) Cu; and
   (5) an alloy of at least two metals, namely a first metal and a second metal, said first metal being selected from the group consisting of:
   (a) Fe;
   (b) Ni;
   (c) Co; and
   (d) Cu,
   said second metal being selected from the group consisting of:
   (a) Al;
   (b) Zn;
   (c) Cd;
   (d) Sn; and
   (e) Mo,
   establishing an electric current in said solution between an anode and a cathode, said substrate constituting said cathode, to thereby induce a deposition of metal on said substrate by reduction of metal ions, said deposited metal forming a binder for retaining particles of said electrocatalytic material on said substrate; and
   periodically turning said cell between at least two predetermined positions to cause a recurrent migration of the particles of electrocatalytic material, under the effect of gravity, toward said substrate whereby particles of the electrocatalytic material are captured in said binder.

2. A process defined in claim 1, wherein said metal ions are nickel ions.

3. A process as defined in claim 1, comprising the step of agitating said solution to cause collisions between the particles of electrocatalytic material.

4. A process as defined in claim 1, wherein said electrocatalytic material is constituted by said metal alloy, said process further comprising the step of leaching the particles of electrocatalytic material captured in said binder to remove said second metal therefrom.

5. A process for manufacturing an electrocatalytic electrode, comprising the steps of:
   placing an electrically conductive substrate in a solution contained in an electrolytic cell, said solution itself containing ions of a metal and dispersed particles of an electrocatalytic material selected from the group consisting of:
   (1) Fe;
   (2) Ni;
   (3) Co;
   (4) Cu; and
   (5) an alloy of at least two metals, namely a first metal and a second metal, said first metal being selected from the group consisting of:
   (a) Fe;
   (b) Ni;
   (c) Co; and
   (d) Cu,
   said second metal being selected from the group consisting of:
   (a) Al;
   (b) Zn;
   (c) Cd;
   (d) Sn; and
   (e) Mo,
   establishing an electric current in said solution between an anode and a cathode, said substrate constituting said cathode, to thereby induce a deposition of metal on said substrate by reduction of metal ions, said deposited metal forming a binder for retaining particles of said electrocatalytic material on said substrate; and
   periodically inverting said cell to cause a recurrent migration of the particles of electrocatalytic material, under the effect of gravity, toward said substrate whereby particles of the electrocatalytic material are captured in said binder.

6. A process as defined in claim 5, wherein said cell is elongated and comprises two ends, and wherein said cell is periodically inverted to cause migration of the particles of electrocatalytic material, under the effect of gravity, from each end of said cell to the other end thereof.

7. A process for producing an electrocatalytic electrode, comprising the steps of:
   placing an electrically conductive substrate having two generally opposite surfaces in a solution contained in an electrolytic cell, said solution itself containing ions of a metal and dispersed particles of an electrocatalytic material selected from the group consisting of:
   (1) Fe;
   (2) Ni;
   (3) Co;
   (4) Cu; and
   (5) an alloy of at least two metals, namely a first metal and a second metal, said first metal being selected from the group consisting of:
   (a) Fe;
   (b) Ni:
   (c) Co; and
   (d) Cu,
   said second metal being selected from the group consisting of:
   (a) Al;

(b) Zn;
(c) Cd;
(d) Sn; and
(e) Mo, establishing an electric current in said solution between an anode means and a cathode, said substrate constituting said cathode, to thereby induce a deposition of metal on each surface of said substrate by reduction of metal ions, said deposited metal forming a binder for retaining particles of said electrocatalytic material on said substrate; and periodically inverting said cell to cause a recurrent migration of the particles of electrocatalytic material, under the effect of gravity, toward each surface of said substrate, whereby particles of the electrocatalytic material are captured in said binder.

8. A process as defined in claim 7, wherein said cell is elongated and comprises two ends, and wherein said cell is periodically inverted to cause a recurrent migration of the particles of said electrocatalytic material, under the effect of gravity, from each end of said cell to the other end thereof.

9. A process as defined in claim 7, wherein said metal ions are nickel ions.

10. A process as defined in claim 7, wherein said anode means includes two anodes, each anode facing a respective one of said surfaces of said substrate, said current establishing step comprising the step of establishing an electric current in said solution between said substrate and each anode.

11. A process as defined in claim 7, comprising the step of agitating said solution to cause collisions between particles of the electrocatalytic material in said solutions.

12. A process as defined in claim 7, wherein said electrocatalytic material is constituted by said metal alloy, said process further comprising the step of leaching said particles of electrocatalytic material captured in said binder to remove said second metal therefrom.

13. An apparatus for producing an electrocatalytic electrode from an electrically conductive substrate immersed in a solution containing ions of a metal and dispersed particles of an electrocatalytic material selected from the group consisting of:
(1) Fe;
(2) Ni;
(3) Co;
(4) Cu; and
(5) an alloy of at least two metals, namely a first metal and a second metal, said first metal being selected from the group consisting of:
(a) Fe;
(b) Ni;
(c) Co; and
(d) Cu, said second metal being selected from the group consisting of:
(a) Al;
(b) Zn;
(c) Cd;
(d) Sn; and
(e) Mo, said electrode producing apparatus comprising:
a cell itself comprising container means to receive said solution, an anode means in electrical contact with said solution, and means for holding said substrate immersed into said solution, said substrate constituting a cathode;

an electric power source connected to said anode means and to said substrate to establish an electric current in said solution between said anode means and said substrate to thereby induce a deposition of metal on said substrate by reduction of metal ions, said deposited metal forming a binder for retaining particles of said electrocatalytic material on said substrate; and means for periodically turning said cell between at least two predetermined positions to cause a recurrent migration of the particles of electrocatalytic material, under the effect of gravity, toward said substrate whereby particles of the electrocatalytic material are captured in said binder, said anode means comprising a pair of spaced apart anodes, said substrate being mounted between said anodes and comprising two generally opposite surfaces to be coated with electrocatalytic material, each surface being faced by a respective one of said two anodes and wherein each anode is formed with a passage allowing particles of the electrocatalytic material to migrate through said passage.

14. An apparatus for producing an electrocatalytic electrode from an electrically conductive substrate immersed in a solution containing ions of a metal and dispersed particles of an electrocatalytic material selected from the group consisting of:
(1) Fe;
(2) Ni;
(3) Co; and
(4) Cu; and
(5) an alloy of at least two metals, namely a first metal and a second metal, said first metal being selected from the group consisting of:
(a) Fe;
(b) Ni;
(c) Co; and
(d) Cu, said second metal being selected from the group consisting of:
(a) Al;
(b) Zn;
(c) Cd;
(d) Sn; and
(e) Mo, said electrode producing apparatus comprising:
a cell itself comprising container means to receive said solution, an anode means in electrical contact with said solution, and means for holding said substrate immersed into said solution, said substrate constituting a cathode;

an electric power source connected to said anode means and to said substrate to establish an electric current in said solution between said anode means and said substrate to thereby induce a deposition of metal on said substrate by reduction of metal ions, said deposited metal forming a binder for retaining particles of said electrocatalytic material on said substrate; and means for periodically turning said cell between at least two predetermined positions to cause a recurrent migration of the particles of electrocatalytic material, under the effect of gravity, toward said substrate whereby particles of the electrocatalytic material are captured in said binder and further comprising means for agitating the solution in said cell.

15. An apparatus as defined in claim 14, wherein said solution agitating means comprises:
- an agitator blade mounted in said cell;
- shaft means connected to said agitator blade, said shaft means protruding outside said cell;
- motor means for driving said shaft means; and
- a releasable coupling between said motor means and said shaft means.

16. An apparatus as defined in claim 14, wherein said cell is elongated and comprises two ends, and wherein said cell turning means comprises means for periodically inverting said cell to cause a recurrent migration of the particles of electrocatalytic material, under the effect of gravity, from each end of the cell toward the other end thereof.

* * * * *